United States Patent
Nikovski

(10) Patent No.: US 8,315,961 B2
(45) Date of Patent: Nov. 20, 2012

(54) METHOD FOR PREDICTING FUTURE ENVIRONMENTAL CONDITIONS

(75) Inventor: Daniel N. Nikovski, Brookline, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 519 days.

(21) Appl. No.: 12/502,676

(22) Filed: Jul. 14, 2009

(65) Prior Publication Data

US 2011/0016070 A1 Jan. 20, 2011

(51) Int. Cl.
*G06F 15/18* (2006.01)
(52) U.S. Cl. .......................... 706/21; 706/12; 706/45
(58) Field of Classification Search .............. 706/12, 706/21, 45
See application file for complete search history.

(56) References Cited

OTHER PUBLICATIONS

Farhadi et al ("Analysis of Effective Variables on Daily Electrical Load Curves of Iran Power Network" IEEE Apr. 2008).*
Uwe Homann ("Time Equivalence of the Tropical Year and the Sidereal Year" 2004).*
Yoshida et al ("Rational operation of a thermal storage tank with load prediction scheme by ARX model approach" 1997).*
Tseng et al ("Combining neural network model with seasonal time series ARIMA model" 2002).*
Keller et al ("Ordinal Analysis of Time Series" 2005).*
Wang et al ("A New Method for Short-term Load Forecasting Integrating Fuzzy-Rough Sets with Artificial Neural Network" 2005).*
Feinberg et al ("Load Forecasting" 2005).*
Dikovski et al ("Memory-Based Modeling of Seasonality for Prediction of Climatic Time Series" 2009).*
Hahn et al ("Electric load forecasting methods: Tools for decision making" Apr. 2009).*

* cited by examiner

*Primary Examiner* — Lut Wong
(74) *Attorney, Agent, or Firm* — Dirk Brinkman; Gene Vinokur

(57) ABSTRACT

An average environmental condition for a specified target date and time is determined by indexing a database of time series data to retrieve the environment condition for each day and time where an orbital position of the earth with respect to the sun is nearest to the orbital position of the earth on the target date and time. The average environmental condition is then determined from the retrieved environmental conditions.

3 Claims, 4 Drawing Sheets

| Year | Date | Time | Ordinal | Temperature |
|---|---|---|---|---|
| 1995 | January 1 | 00:00 | 0 | 25F |
| 1995 | January 1 | 00:15 | 0 | 26F |
| ... | ... | ... | ... | ... |
| 1996 | January 1 | 00:00 | 365 | 30F |
| ... | ... | ... | ... | ... |
| 2008 | January 1 | 00:00 | 4748 | 35F |
| ... | ... | ... | ... | ... |
| 2008 | July 6 | 15:30 | 4935 | 75F |

*Figure 2*

METHOD FOR PREDICTING FUTURE ENVIRONMENTAL CONDITIONS

FIELD OF THE INVENTION

This invention relates generally to predicting future variations in the environment, and more particular to predicting future temperature, daylight, and humidity.

BACKGROUND OF THE INVENTION

Many practical applications, such as determination of future power demand, depend on predicting future environmental conditions, e.g., temperature, daylight and humidity. Because measurements of environmental conditions form non-stationary time series, their prediction for applications such as power generation and distribution, fuel prices, and the scheduling of the operation of heating, ventilation and air conditioning (HVAC) equipment is more complicated.

A number of time series prediction methods are based on an auto-regressive moving average (ARMA) model. The ARMA model, also known as the Box-Jenkins model, predicts future values from time series data $X_t$. The model includes an autoregressive (AR) part, and a moving average (MA) part. ARMA models are suitable for prediction of stationary time series, but do not perform well on non-stationary time series.

One method for predicting non-stationary data takes the difference of the time series as many times as necessary to make the resulting time series stationary. Such a model is also known as an integrated ARMA (ARIMA) model. However, if the seasonal and diurnal components are non-linear after the differencing, then the resulting time series can exhibit non-linear dependencies, which would preclude the use of low-order linear prediction models for the modeling.

The direct application of more advanced machine learning techniques, such as neural networks, wavelets, and support vector machines (SVM), to the prediction of time series data can often be inaccurate, despite their ability to model dynamic systems. This has been attributed to both numerical optimization difficulties, as well as to possible mismatches between the model and the physical process that generates the time series data.

Therefore, it is desired to predict accurately future conditions in non-stationary environments.

SUMMARY OF THE INVENTION

The embodiments of the invention provide a method for predicting future environmental conditions that includes cyclical and random components. The cyclical components include annual seasonal variations due to the earth rotating around the sun, and diurnal variations due to the earth rotating around its axis. The cyclical components are fairly predictable and can be stored in a database as time series data. The random components are due to random meteorological conditions, which can be acquired in real-time as needed.

The method decomposes the time series data as a sum of cyclical components, and a random component. The cyclical and random components are modeled separately. The two models can be different. For example, the models of the cyclical components can be non-linear, while the model for the random component can be linear.

Using a conventional decomposition model, we represent time series data $X_t$ by a sum of cyclical component $s_t$, and a random component $Y_t$ as $$X_t = s_t + Y_t.$$

The random component $Y_t$ is stationary, and can be predicted from past values $Y_{t-1}, Y_{t-2}, \ldots, Y_{t-w}$, for some width w of a window of past values. The seasonal and diurnal component have fixed periods, i.e., "annually" and daily.

The problem with the seasonal component is that the cycle of the annual component is not an integer number of days (365), but slightly longer. The exact duration of the cycle, called a sidereal year, is equal to 365.2563042 days. The invention computes the seasonal average in consideration with this discrepancy, leading to an increased accuracy of prediction.

BRIEF DESCRIPTION OF THE DRAWINGS

FIG. 2 is a partial table of time series environmental data used by embodiments of the invention.

DETAILED DESCRIPTION OF THE PREFERRED EMBODIMENT

The embodiments of our invention provide a method for predicting future environmental conditions from time series data stored in a memory. The time series data includes cyclical annual and diurnal components, and random meteorological components. The steps of the method are performed in a processor, including memories and input/output interfaces as known in the art.

Modeling of Seasonality

In one embodiment, the environmental condition is air temperature. Other environmental conditions can include humidity and daylight intensity. Our method predicts the ambient condition for a specified location, date and time. The predicted condition 171 can be used to estimate an actual thermal load for heating, ventilation and air conditioning (HVAC) and power equipment, and optimal scheduling of operations thereof. Typical prediction periods are for 24 hours in the future, although longer periods can also be specified.

The ambient temperature at a location is subject to cyclical variations due to annual and diurnal components, which can be store in a database.

In addition, a random component is caused by short term meteorological phenomena, such as cold and warm fronts, cloud cover, wind, solar activity, and precipitation (rain, sleet, snow, hail, etc.) The random component tends to be persistent for the prediction period.

As an advantage, the embodiments of the invention take into account that the length of the calendar year does not equal that of the sidereal year.

Figure 1A:
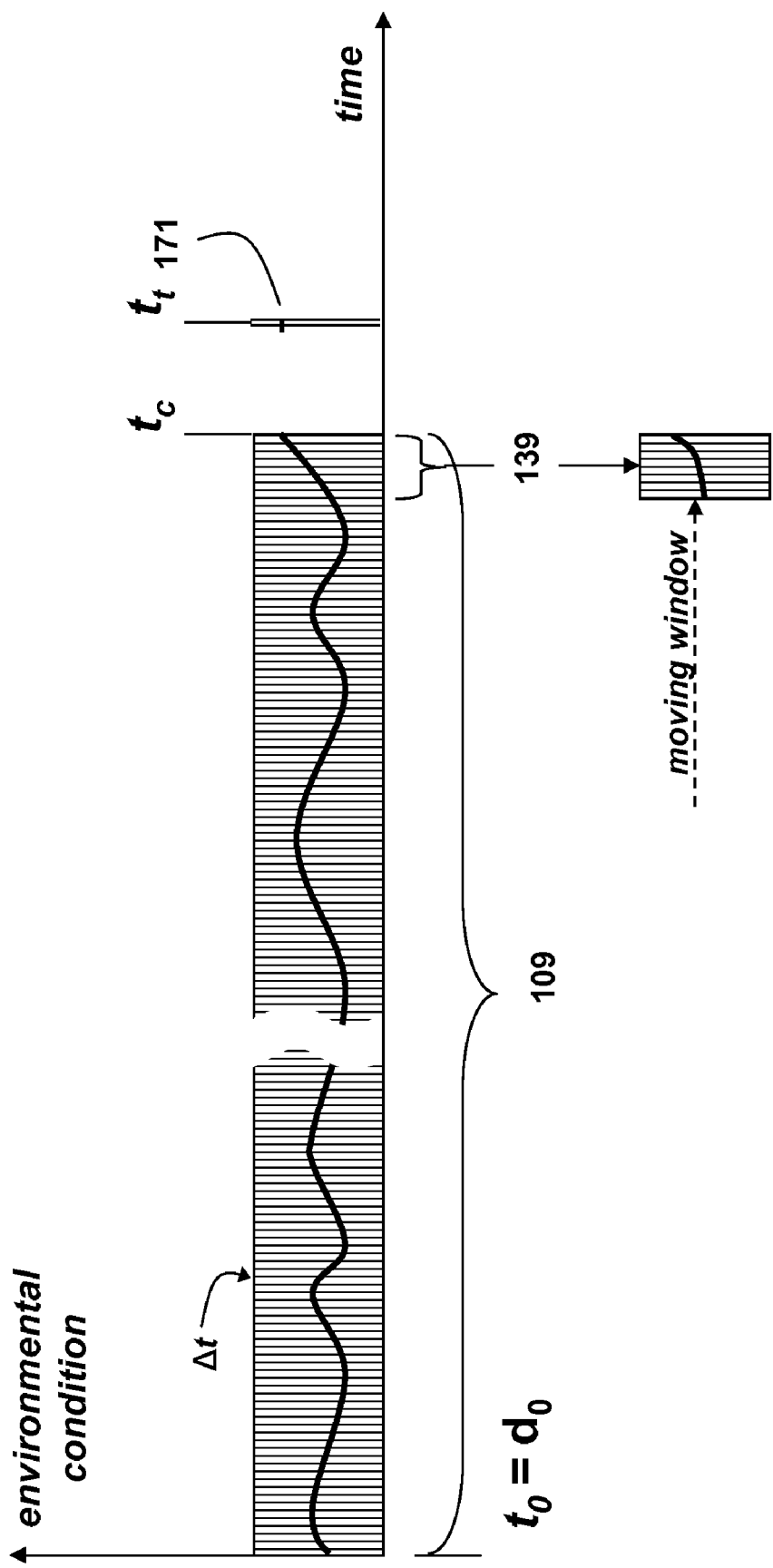
FIG. 1A is a schematic of a method for determining cyclical environmental averages according to embodiment of the invention.
Figure 1B:
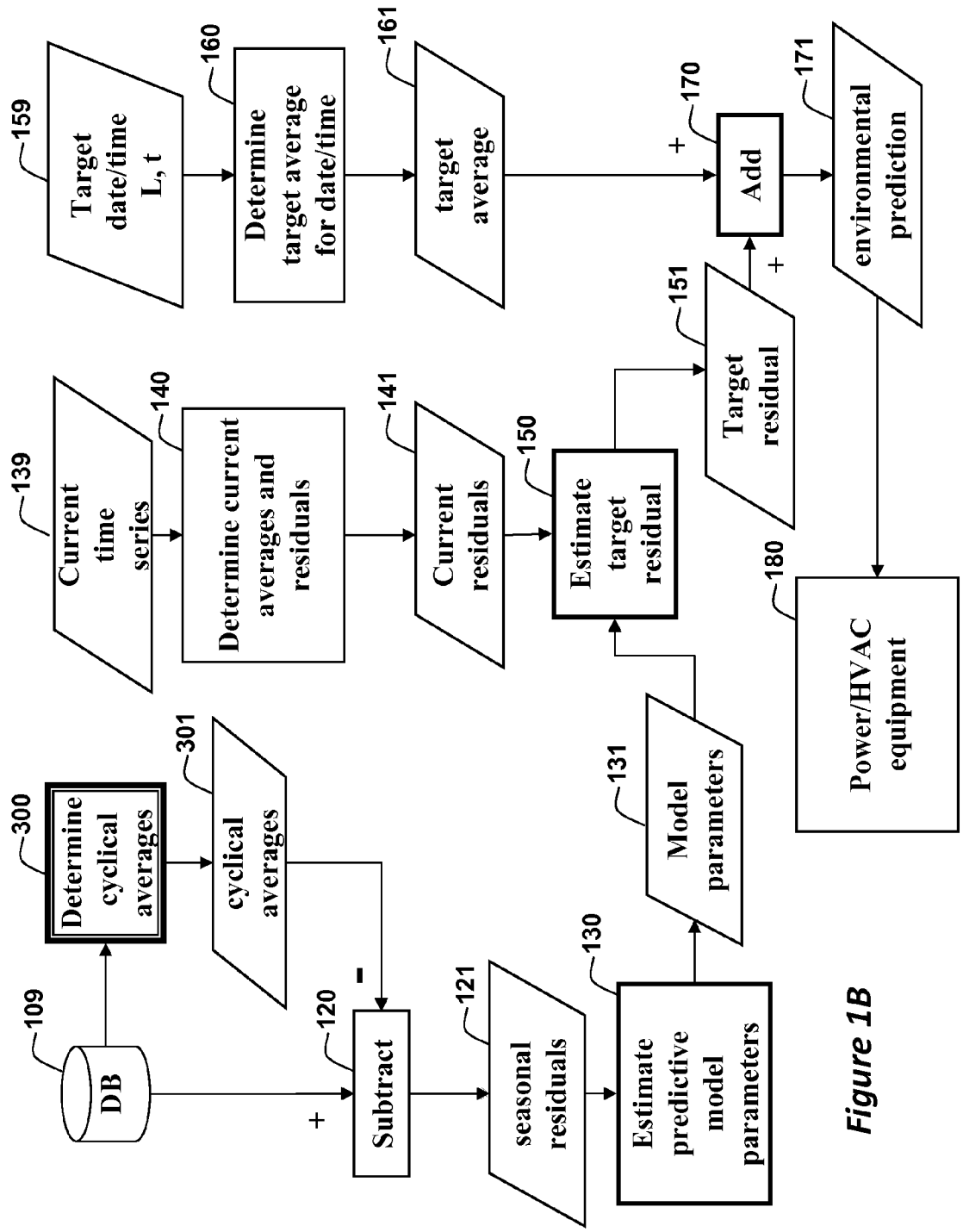
FIG. 1B is a flow diagram of a method for predicting future environmental conditions according to embodiments of the invention.

FIGS. 1A-1B show the predictive method schematically and procedurally, respectively. FIG. 1A shows time series data stored in a database 109. To facilitate accessing the correct time series data, the entries are not indexed by date and time, but rather by ordinal days D.

The first entry $t_0$ in the database is associated with ordinal day $d_0$. Entries can be added in incremental steps, e.g., $\Delta t=1$ hour.

Figure 3:
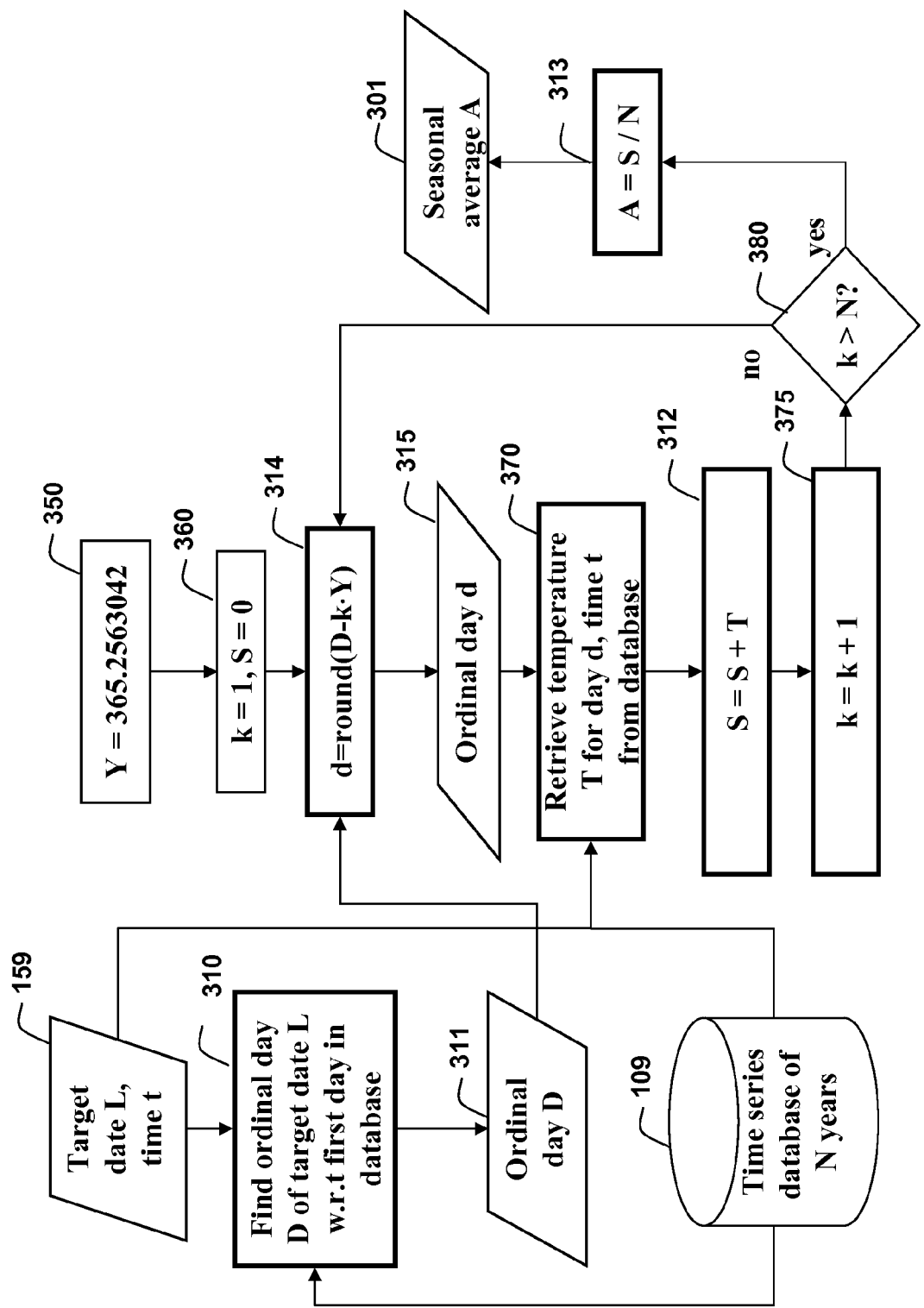
FIG. 3 is a flow diagram of a method for determining the cyclical environmental averages according to embodiment of the invention.

As shown in FIGS. 1B and 3, we determine 300 the cyclical average 301 from the time series data stored in the database (DB) 109. The averages are subtracted 120 from the time series data 109 to determine cyclical residuals 121, which deseasonalizes the time series data. The residuals can be used to estimate 130 parameters 131 of a prediction model, e.g., ARMA, ARIMA, neural and Bayesian networks, wavelets, support vector machines (SVM), k-NN clustering, etc.

The time series data includes a moving window of current time series data 139 associated when current time $t_c$ when a prediction for a future target time $t_f$ 159 is made. The daily variation of temperatures at a specified location usually depends on annual and diurnal variations, i.e., the day of the year (date) and the time of the day because shadows cast on buildings change over time and seasons. Therefore, we determine 140 current averages and residuals 141, and use the current residual to estimate the target residual at time $t_f$ 159, assuming the difference between $t_c$ and $t_f$ is small, e.g., a day or less.

Then, for the specified target date L and time t, we determine the target average 161. The target average and target residual are added 160 to predict the future environmental condition 171.

FIG. 2 shows example years, dates and times for ordinal days D, and the corresponding temperature.

Averaging

For the seasonal average, calendar averaging is inaccurate because the period of rotation of the earth around the sun is approximately 365.2563042 days, also known as a sidereal year. The extra quarter day is corrected by a leap year every four years. The remaining difference is accounted for in that calendar years that are divisible by 100 are not leap years, unless the years are divisible by 400, in which case they are leap years. As a consequence, the average temperature when specified for a combination of date and time of the day is not accurate.

For example, it is inaccurate to use the average temperature at 3 p.m. on every January 23, because depending on the year, the earth is at a significantly different positions along its orbit, and the impact of the sun on the environment is consequently different on that date and time.

Therefore, as shown in FIG. 3, our memory based prediction method uses sidereal averaging, and determines 310 the target ordinal day index D 311 of the target prediction moment based on the target date L and time t 159, where $d_0$ 312 is the first entry in the database. The length of the sidereal year 350 is set. An offset k and sum S are initialized 360.

Then, for every year of data stored in the database, the corresponding ordinal day d in that year is determined after multiplying the year offset k by the length 350 of the sidereal year, and rounding 314 to the closest integer ordinal day 315. In general, the calendar date of the ordinal day would not coincide with the calendar date of the target day.

After the correct ordinal day is determined, the stored temperature T for that day at time t is retrieved 370 from the database 109, accumulated 312 in S. The steps are repeated for all years N in the database and offsets k 375. When the termination condition 380 is reached, the sum S is normalized 313 by the number of years N represented in the database, to arrive at the seasonal average estimate A 301.

Thus, our seasonal average retrieves environmental conditions from the database for days d and time t when the orbital position of the earth with respect to the sun is nearest to the orbital position of the earth on the target date D and time t. The retrieved environmental conditions are summed and divided by their number of instances to obtain the average.

EFFECT OF THE INVENTION

A method for prediction environmental conditions based on the position of the sun in its orbit around the sun.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for determining an average environmental condition, comprising a processor for performing steps of the method, comprising:

specifying a target date and time for determining an average environmental condition, wherein time series data include cyclical annual and diurnal components, and random meteorological conditions, and wherein the cyclical annual and diurnal components are modeled as non-linear while the random meteorological conditions are modeled as linear;

converting the target date and time to an ordinal day for indexing the database, wherein the ordinal day corresponds to a stored environment condition in the database;

indexing a database of time series data to retrieve the stored environment condition for each day and time where an orbital position of the earth with respect to the sun is nearest to the orbital position of the earth on the target date and time;

determining the average environmental condition from the stored environmental conditions, wherein the average environmental condition is used to determine a seasonal residual, and wherein the seasonal residual is used to estimate parameters of a predictive model; and predicting a future environmental condition for a specified location based on the average environmental condition, wherein the prediction uses sidereal averaging.

2. The method of 1, wherein the environmental conditions includes temperature, humidity, or daylight intensity.

3. The method of claim 1, further comprising: estimating an actual thermal load for heating, ventilation and air conditioning or power equipment based on the future environmental condition.

* * * * *